US011669435B2

(12) United States Patent
Taylor et al.

(10) Patent No.: US 11,669,435 B2
(45) Date of Patent: Jun. 6, 2023

(54) CHAT BOT DIAGNOSTIC VISUALIZATION

(71) Applicant: Microsoft Technology Licensing, LLC, Redmond, WA (US)

(72) Inventors: John Anthony Taylor, Bellevue, WA (US); Christopher Michael Whitten, Seattle, WA (US); Steven Wayne Ickman, Redmond, WA (US); Thomas Matthew Laird-McConnell, Kirkland, WA (US); Christopher Lee Mullins, Sammamish, WA (US); Scott Jeff Gellock, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 735 days.

(21) Appl. No.: 16/453,014

(22) Filed: Jun. 26, 2019

(65) Prior Publication Data
US 2020/0409818 A1 Dec. 31, 2020

(51) Int. Cl.
*G06F 11/36* (2006.01)
*G06F 3/0484* (2022.01)
*H04L 51/02* (2022.01)

(52) U.S. Cl.
CPC ......... *G06F 11/366* (2013.01); *G06F 3/0484* (2013.01); *G06F 11/3636* (2013.01); *G06F 11/3664* (2013.01); *H04L 51/02* (2013.01)

(58) Field of Classification Search
CPC .. G06F 3/0484; G06F 11/366; G06F 11/3636; G06F 11/3664; H04L 51/02
See application file for complete search history.

(56) References Cited

U.S. PATENT DOCUMENTS 6,026,362 A * 2/2000 Kim ................... G06F 11/3664
705/317
6,113,645 A * 9/2000 Benitz ................ G06F 11/3664
703/22

(Continued)

OTHER PUBLICATIONS

Pauw et al., "Visual Debugging for Stream Processing application", published by IBM T.J. Watson Research Center, pp. 1-19 (Year: 2010).*
Kacsuk et al, "A Graphical Development and Debugging Environment for Parallel Programs", published by Pennstate university, Preprint submitted to Elsevier Science, p. 1-20 (Year: 2011).*
Das, Somak, "Debugging botframework application in various channels", Retrieved from: https://chatbotslife.com/debugging-botframework-application-in-various-channels-35e85dc9a93f, Jan. 10, 2018, 11 Pages.

(Continued)

*Primary Examiner* — S. Sough
*Assistant Examiner* — Zheng Wei

(57) ABSTRACT

The present disclosure relates to processing operations configured to generate and present a chat bot diagnostic visualization that provides real-time visual insights into operation of a chat bot for debugging assistance. A chat bot diagnostic tool is programmed to launch a graphical user interface that displays a visual representation of diagnostic data for debugging a chat bot in real-time. To enable conversational specific data to be reviewed, the present disclosure is configured to implement a middleware adapter within in a run-time stack of a chat bot that is configured to trace data traffic between a chat bot and a channel of an application/service. This enables the chat bot diagnostic tool to observe data traffic and filter the data traffic to identify relevant data for debugging a chat bot. A debugging data visualization of a chat bot interaction is emulated through a graphical user interface of the chat bot diagnostic tool.

20 Claims, 6 Drawing Sheets

(56) References Cited

U.S. PATENT DOCUMENTS

| | | | | |
|---|---|---|---|---|
| 8,072,926 | B1* | 12/2011 | Billman | H04L 67/08 455/418 |
| 10,754,885 | B2* | 8/2020 | Yao | G06F 3/0486 |
| 11,038,906 | B1* | 6/2021 | Bingham | G06N 20/00 |
| 2004/0157664 | A1* | 8/2004 | Link | A63F 13/48 463/43 |
| 2010/0162212 | A1* | 6/2010 | Stall | G06F 11/3664 717/124 |
| 2013/0318500 | A1* | 11/2013 | Eker | G06F 11/3664 717/125 |
| 2014/0082511 | A1* | 3/2014 | Weissberg | G06F 9/452 715/740 |
| 2014/0123005 | A1* | 5/2014 | Forstall | G06F 16/44 715/716 |
| 2014/0317602 | A1* | 10/2014 | Zuo | G06F 11/362 717/125 |
| 2019/0163694 | A1 | 5/2019 | Yao | |
| 2020/0342032 | A1* | 10/2020 | Subramaniam | G06N 3/006 |

OTHER PUBLICATIONS

Denisemak, et al., "Debug with the emulator", Retrieved from: https://docs.microsoft.com/en-us/azure/bot-service/bot-service-debug-emulator?view=azure-bot-service-3.0&tabs=csharp, Feb. 26, 2019, 09 Pages.

Ivorb, et al., "Middleware", Retrieved from: https://docs.microsoft.com/en-us/azure/bot-service/bot-builder-concept-middleware?view=azure-bot-service-4.0, May 23, 2019, 06 Pages.

"International Search Report and Written Opinion Issued in PCT Application No. PCT/US2020/031253", dated Aug. 27, 2020, 12 Pages.

Robstand, et al., "Intercept messages in the v3 JavaScript SDK", Retrieved from: https://docs.microsoft.com/en-us/azure/bot-service/nodejs/bot-builder-nodejs-intercept-messages?view=azure-bot-service-3.0#example, Nov. 2, 2018, 02 Pages.

"Notice of Allowance Issued in EP Patent Application No. 20728594. 1", dated Mar. 3, 2023, 8 Pages.

* cited by examiner

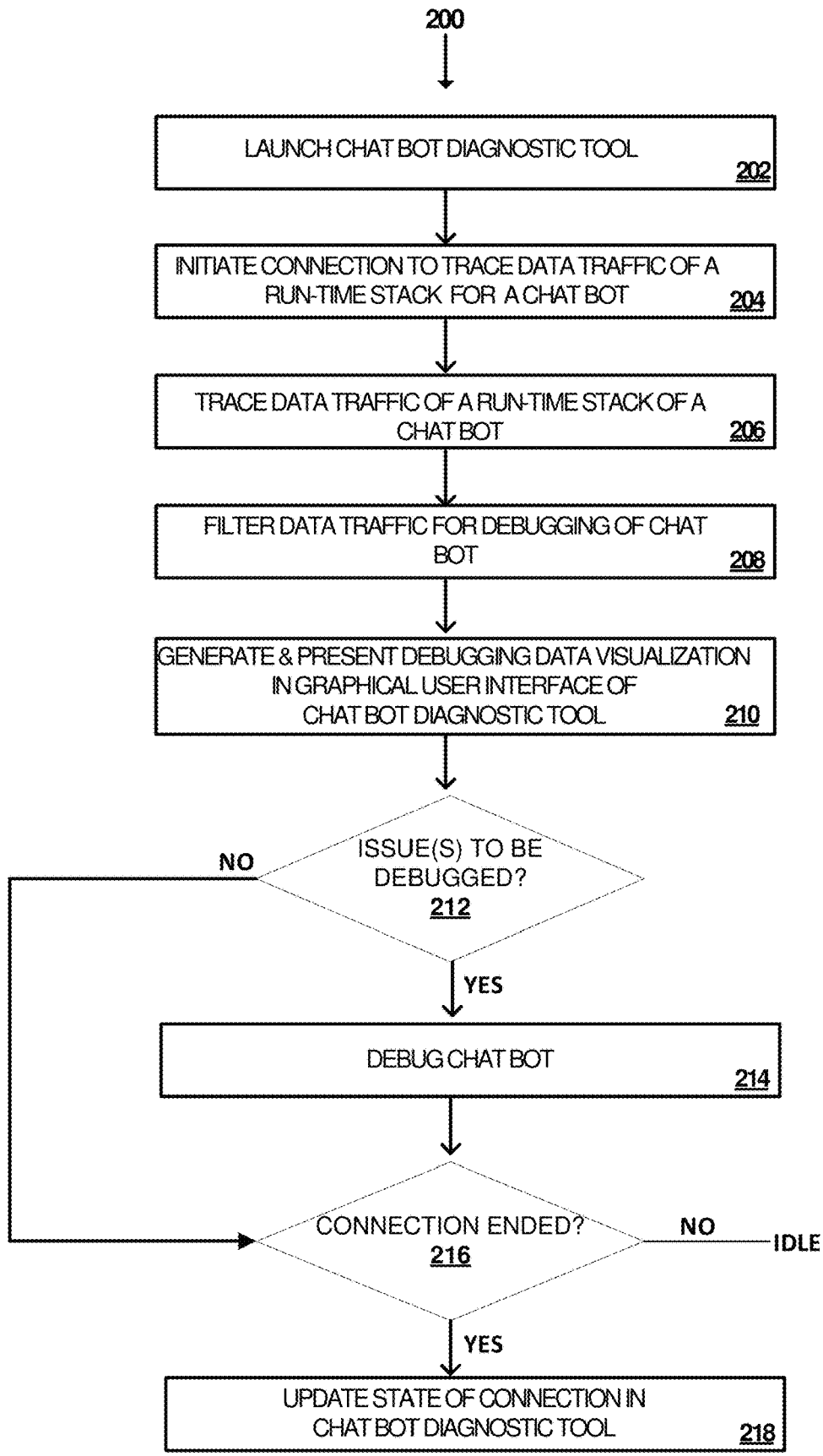

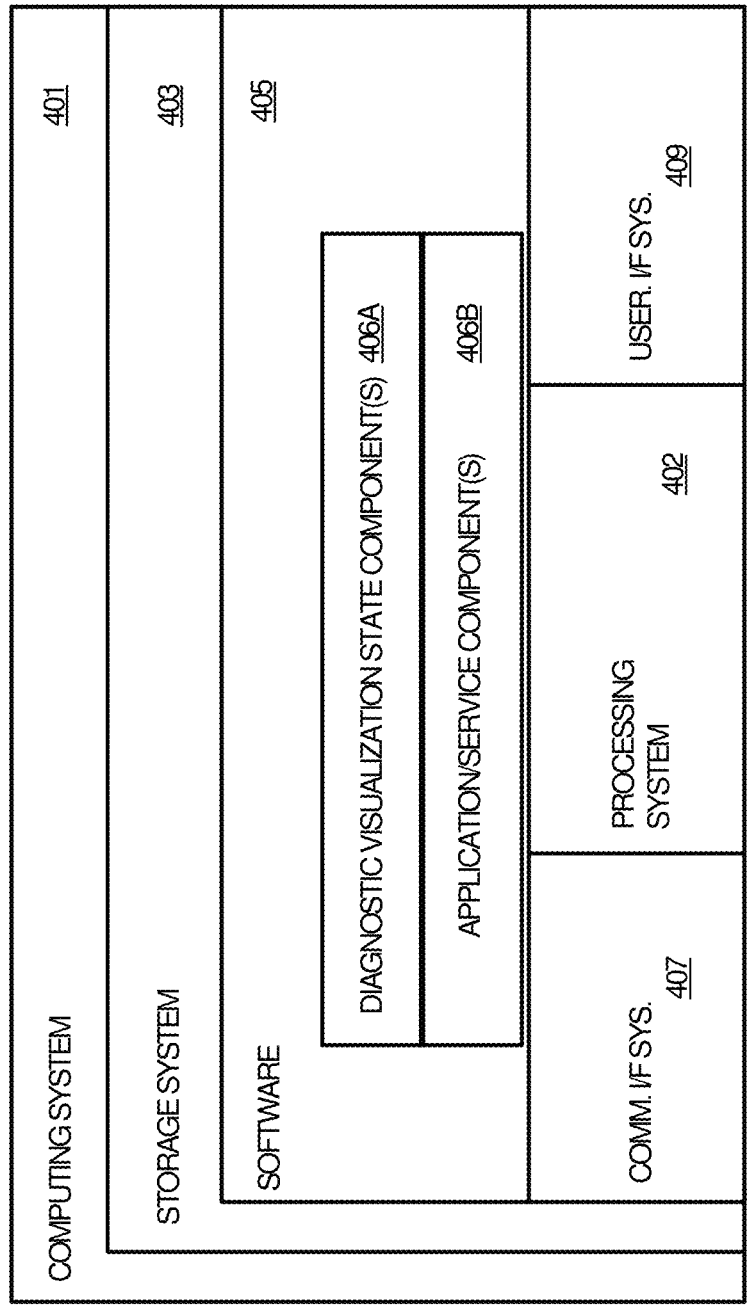

CHAT BOT DIAGNOSTIC VISUALIZATION

BACKGROUND

Chat bots are computer programs providing artificial intelligence that is trained to conduct conversations with users. While chat bots attempt to convincingly simulate how a human would behave as a conversation partner, users are often frustrated by interactions with the chat bot. This is partly due to bugs in the code of the chat bots, which may cause problems such as: 1) asking a user to re-provide information they already provided the chat bot; and 2) improperly managing a task state of a chat bot such as improperly switching between states when important information is not collected or not recognizing that important information has been collected, among other technical problems. As such, chat bots often require debugging to execute more efficiently and accurately.

When it comes to debugging code, debuggers often require that a program be debugged offline. This limits an ability of a chat bot to be adapted during real-time conversational processing. As a result, a user may have a poor experience interacting with a chat bot and left with only a hope that issues are remedied at some later point in time. Additionally, when it comes to identifying and remediating technical issues for debugging purposes, developers have to manually review code that was executed and manually add break points to review specific portions of code to identify and debug issues. This is not only inefficient from a processing standpoint but also very time consuming and burdensome for developers as there is no visually identifiable correlation between messages received by or sent to a chat bot and a task state of the chat bot. As such, the debugging process can be improved to resolve such technical problems.

An added layer of technical complexity arises when a chat bot is integrated to work with third-party applications/services. Typically, there is not visibility into run-time activity processing of specific protocol data of an application/service that a chat bot may be interacting with. As many applications/services operate as a closed system, tools for observing protocol data are not typically included in a same processing stack thereby making it a difficult task to be able to understand a context surrounding specific interactions of a chat bot.

SUMMARY

In view of the foregoing technical challenges, the present disclosure relates to processing operations configured to generate and present a chat bot diagnostic visualization that provides real-time visual insights into operation of a chat bot for debugging assistance. For instance, a chat bot diagnostic tool is programmed to launch a graphical user interface that displays a visual representation of diagnostic data for debugging a chat bot. This reflects real-time (or near real-time) conversation of a chat bot with a data channel of an application/service whether that application/service is proprietary or a third-party application/service. To enable conversational specific data to be reviewed, the present disclosure is configured to implement a middleware adapter within in a run-time stack of a chat bot that is configured to trace data traffic between a chat bot and a channel of an application/service. This enables the chat bot diagnostic tool to observe data traffic and filter the data traffic to identify relevant data for debugging a chat bot. A debugging data visualization of a chat bot interaction may be emulated through a graphical user interface of the chat bot diagnostic tool.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method related to processing operations for generation and provision of a chat bot diagnostic visualization, with which aspects of the present disclosure may be practiced.

FIG. 4 illustrates a computing system suitable for implementing processing operations described herein related generation and presentation of a chat bot diagnostic visualization, with which aspects of the present disclosure may be practiced.

DETAILED DESCRIPTION

Figure 1A:
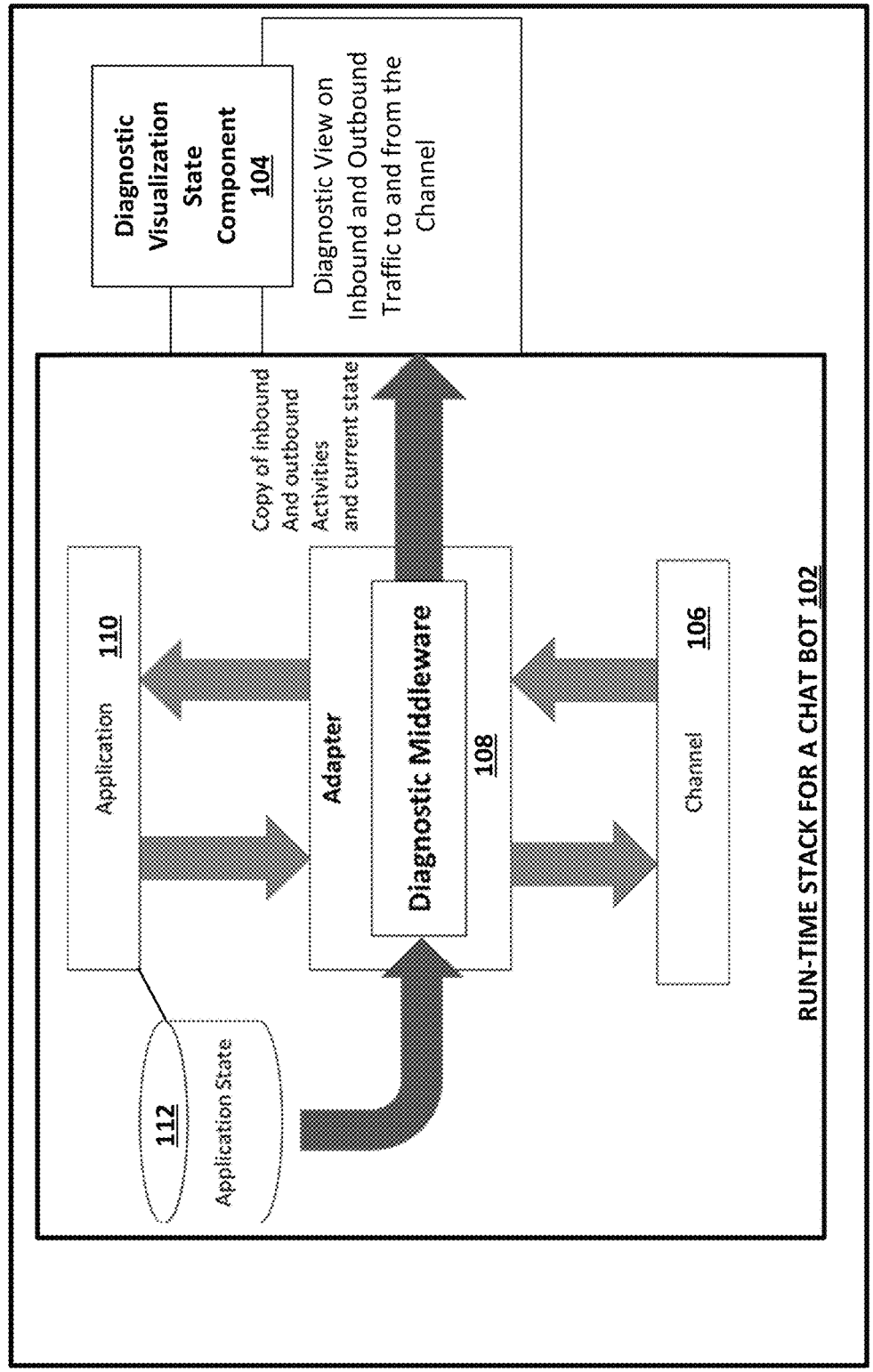
FIGS. 1A-1C illustrate exemplary process flows for interaction between a run-time stack for a chat bot and a diagnostic visualization state component as described herein, with which aspects of the present disclosure may be practiced.

The present disclosure relates to processing operations configured to generate and present a chat bot diagnostic visualization that provides real-time visual insights into operation of a chat bot for debugging assistance. For instance, a chat bot diagnostic tool is programmed to launch a graphical user interface that displays a visual representation of diagnostic data for debugging a chat bot. This reflects real-time (or near real-time) conversation of a chat bot with a data channel of an application/service whether that application/service is proprietary or a third-party application/service. To enable conversational specific data to be reviewed, the present disclosure is configured to implement a middleware adapter within in a run-time stack of a chat bot that is configured to trace data traffic between a chat bot and a channel of an application/service. This enables the chat bot diagnostic tool to observe data traffic and filter the data traffic to identify relevant data for debugging a chat bot. Examples of data, that may be communicated through a run-time stack of a chat bot, that may be useful to debugging a chat bot comprise but is not limited to: message activity during a chat bot interaction; and a conversational task state of the chat bot during the chat bot interaction, among other non-limiting examples. Visual correlation between the message activity and the conversational task state provides a developer with the ability to efficiently identify bugs in the code of the chat bot for debugging purposes. A debugging data visualization of the chat bot interaction may be emulated through a graphical user interface of the chat bot diagnostic tool.

Emulation processing to generate an exemplary debugging data visualization may comprise emulating, in real-time (or near real-time), message activity and the conversational task state of the chat bot for a developer to debug the chat bot. For example, filtered message activity and data related to a conversational task state may be presented in a visually appealing manner, through a graphical user interface, so that users can easily and efficiently execute debugging processing, for example, through correlation of message activity with a conversational task state of a chat bot. In one non-limiting example, a chat bot diagnostic tool may be configured to display, through a graphical user interface, a debugging data visualization that comprises message activity and a conversational task state of a chat bot interaction, for example, that is occurring through a data channel of an application/service. This may occur in different user interface elements (e.g., user interface panes/windows) so that a developer can focus on specific types of content and related code.

In further non-limiting examples, code related to a conversational task state of a chat bot and/or code related to a user state (e.g., of a user interacting with a chat bot) may also be displayed through the graphical user interface. For instance, code representing a real-time representation of the conversation task state of the chat bot may be displayed, where the code comprises a bot state differential that indicates a point at which the chat bot changed tasks in the chat bot interaction. This may help a developer identify a potential bug in a chat bot because the point in which the chat bot executed a decision to change tasks is brought into focus. In further non-limiting examples, a chat bot diagnostic tool may be configured to highlight, through the graphical user interface, specific message activity that correlates with a change in the bot state differential to further assist with debugging of the chat bot. For instance, a developer may select a portion of code related to the bot state differential that indicates a change in a conversation task state of a chat bot. The chat bot diagnostic tool may be configured to highlight, through the graphical user interface, message activity that was the trigger for a change in the bot state differential.

Additionally, a debugging data visualization may further comprise display of a log of traced data traffic between the chat bot and the channel of the application or service. This may enable developers to review all data processed by a chat bot to help gain a fuller picture as to potential issues that may be plaguing a chat bot during a chat bot interaction. The debugging data visualization may further be configured to display a status of a connection for tracing data traffic passed through a run-time stack of a chat bot. For example, the chat bot diagnostic tool may be configured to enable a developer to initiate, via a middleware adapter, a connection to a real-time chat bot interaction, through the debugging data visualization. In other alternative examples, the chat bot diagnostic tool may be configured to automatically initiate, via a middleware adapter, a connection for tracing data traffic, where display of a debugging data visualization may present insights into an active chat bot interaction. In further examples, the developer can modify a state of the connection through the debugging data visualization.

Moreover, the chat bot diagnostic tool may be further configured to correlate and display other types of data to assist with debugging of the chat bot. For instance, other types of data traffic may be filtered and presented through the debugging data visualization. Non-limiting examples of such data traffic may comprise but is not limited to: data traffic related to a real-time state of the channel during the chat bot interaction; data traffic related to a change in participants in the chat bot interaction through a channel, data traffic related to detection of a modality of the received input (e.g., voice, typed, handwritten); and data traffic related to user interactions with devices during the chat bot interaction, among other examples. The chat bot diagnostic tool may further be configured to interface with other knowledge repositories to acquire feedback data to assist with debugging. For example, signal data may be collected and aggregated to one or more levels (e.g., application/service level, user level, device level or a combination thereof), which may provide further insights to help debug issues with a chat bot. Telemetry data may be generated at one or more of the signal levels, where metrics may be presented in a user interface element (e.g., pane or window) of the graphical user interface to assist developers with assessing a chat bot. In further instances, the debugging data visualization may additionally comprise real-time status of developers and/or developer feedback during debugging processing, for example, that may be presented through a graphical user interface of the chat bot diagnostic tool. For instance, developers may be collaboratively working to resolve a bug in real-time. In such instances, it is helpful to understand progress of another developer such as what code they are inspecting, highlighting of potential bugs, changes to code and/or developer comments during a debugging session, among other examples.

Exemplary technical advantages provided by processing described in the present disclosure comprise but are not limited to: implementation of a diagnostic visualization state component that presents chat bot diagnostic tool providing real-time visual insights into operation of a chat bot for debugging purposes; generating and presenting, through the chat bot diagnostic tool, a debugging data visualization through an adapted graphical user interface; generation and implementation of a middleware adapter, communicating with the diagnostic visualization state component, to interface within a run-time stack of a chat bot, wherein the middleware adapter is usable to trace data traffic used for the debugging data visualization; enhancement of processing efficiency during debugging of a chat bot in real-time (or near real-time); improved processing efficiency (e.g., reduction in processing cycles, saving resources/bandwidth) for computing devices when debugging a chat bot; reduction in latency during debugging processing through provision of an exemplary debugging data visualization; enabling a diagnostic visualization state component to interface with a plurality of applications/services (e.g., applications/services of a software application platform) to extend functionality of a chat bot diagnostic tool during execution; and improving usability of applications/services for users, among other technical advantages.

Figure 1B:
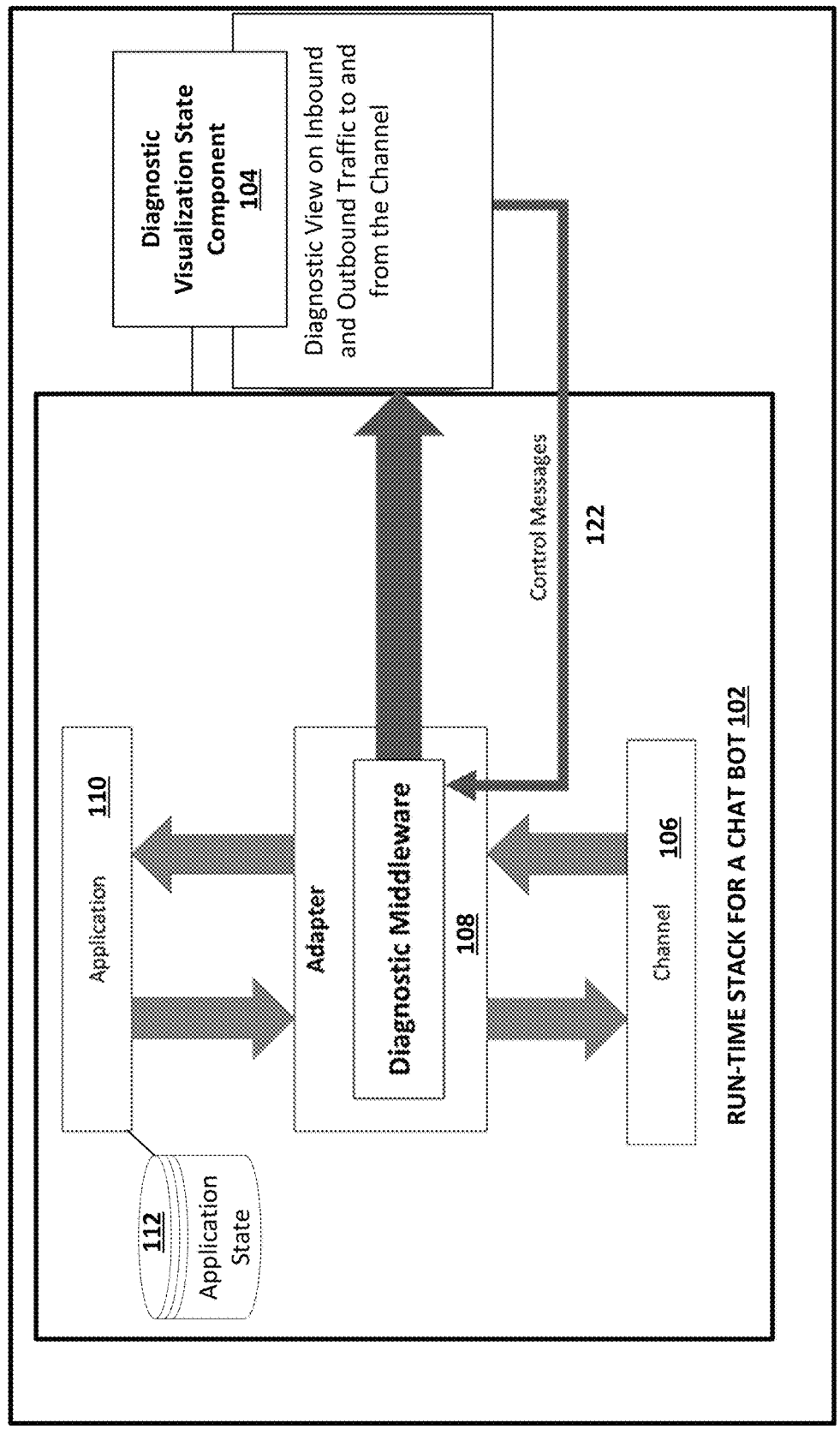
Figure 1C:
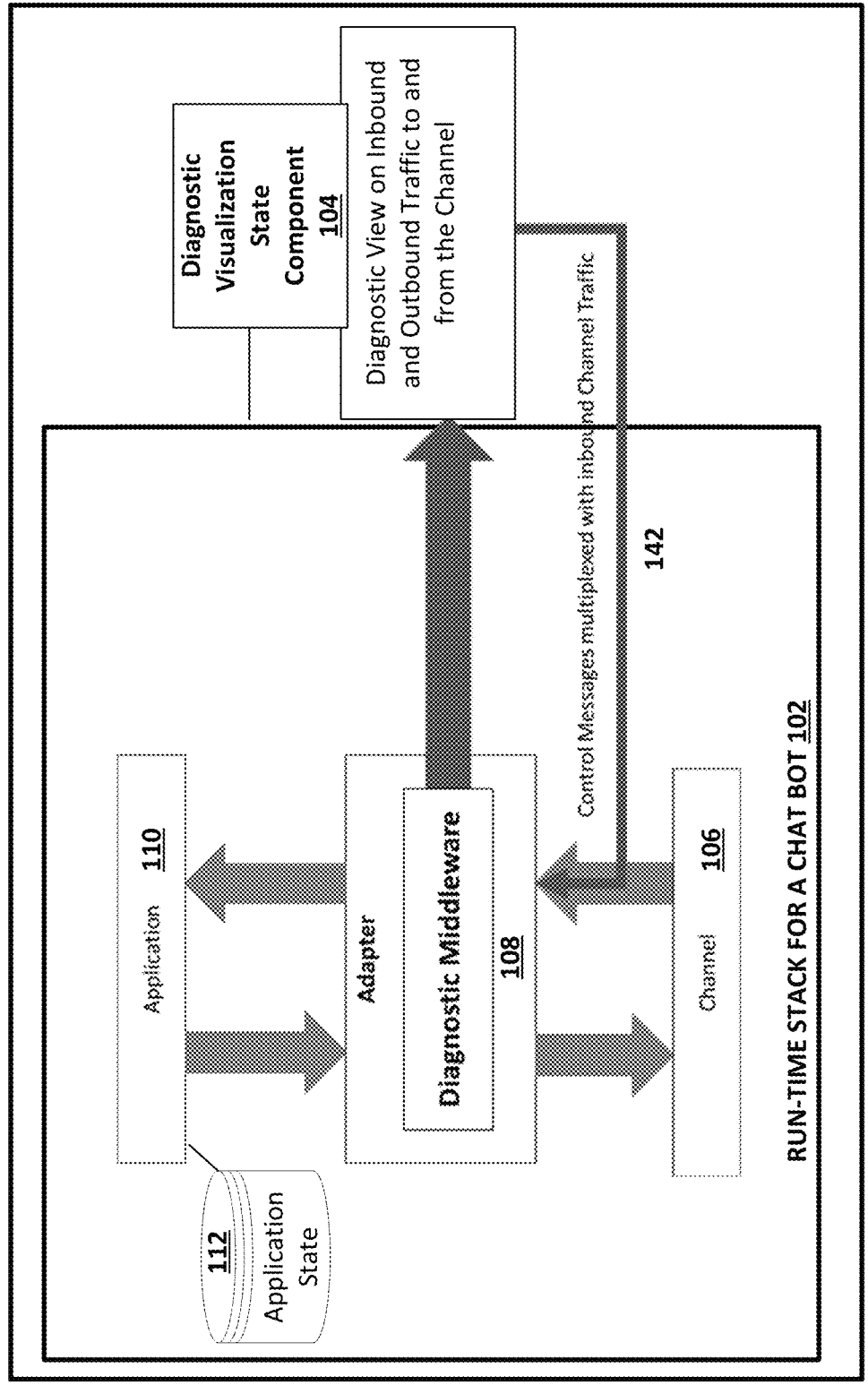

FIGS. 1A-1C illustrate exemplary process flows 100-160, respectively, for interaction between a run-time stack for a chat bot and a diagnostic visualization state component as described herein, with which aspects of the present disclosure may be practiced. As an example, components illustrated in process flows 100-160 may be executed by an exemplary computing system (or computing systems) as described in the description of FIG. 4. Exemplary components, described in process flows 100-160, may be hardware and/or software components, which are programmed to execute processing operations described herein. In some examples, components of process flows 100-160 may each be one or more computing devices associated with execution of a specific service. Exemplary services may be managed by an application platform that also provides, to a component, access to and knowledge of other components that are associated with applications/services. In one instance, processing operations described in process flows 100-160 may be implemented by one or more components connected over a distributed network. Operations performed in process flows 100-160 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In exemplary illustrations of process flows 100-160, there are process flow steps that are aimed at emphasizing non-limiting examples of interaction between components shown in FIGS. 1A-1C. Process flow between components may be altered without departing from the spirit of the present disclosure. Moreover, process flows 100-160 describe components that may be utilized to execute method 200 (FIG. 2) as well as provide user interface examples illustrated and described in FIG. 3 and the accompanying description.

Process flow 100 illustrates a run-time stack for a chat bot 102 interfacing with a diagnostic visualization state component 104, which results in a debugging data visualization being generated and provided through the diagnostic visualization state component 104. The run-time stack of a chat bot 102 comprises a data channel component 106, a diagnostic middleware component 108 an application/service component 110 and an application state storage component 112. Traditional stack structure and interfacing of components for management chat bot processing is known to one skilled in the field of art. For example, a run-time stack for a chat bot processing may comprise a plurality of components configured to manage chat bot processing so that a chat bot is able to interface with one or more applications/services to provide chat bot functionality. Above what is known, an exemplary run-time stack of a chat bot 102 is adapted over traditional stack structures as the run-time stack of a chat bot 102 incorporates components that are specifically targeted for diagnostic analysis and debugging of a chat bot, for example, during real-time (or near real-time) execution.

An application/service component 110 is configured to manage access to applications/services to enable chat bot functionality. In doing so, the application/service component 110 manages applications/services, including a chat bot application/service, through which a user may initiate an interaction (e.g., conversation) with a chat bot. A chat bot may be either called directly through an application/service that a user is working in or may be called directly through a chat bot application/service. In one example, an application/service component 110 manages a chat bot applications/service that interfaces with a data channel of another application/service, which a user may be working within to initiate a chat bot interaction.

Applications/services, managed by an application/service component 110, may be any type of programmed software. An exemplary application/service is a productivity application/service that is configured to enable users to complete tasks on a computing device through either an individual application/service experience or a collaborative application/service experience. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, team collaborative applications/services and social networking applications/services, among other examples. In some examples, an exemplary productivity application/service may be a component of an application platform providing a suite of productivity applications/services. An application platform suite is configured to providing access to a plurality of applications/services, thereby enabling cross-application/service usage to enhance functionality of a specific application/service at run-time. Moreover, specific application/services as well as application platform suites (e.g., software application platform providing correlated access to a plurality of applications/services) may be configured to interface with other non-proprietary application/services (e.g., third-party applications/services) to enable processing of chat bot interactions.

An exemplary data channel component 106 is configured to manage data channels across applications/services, where interactions with a chat bot may occur in a contextually specific scenarios through a data channel. A data channel corresponds to a specific message thread of an application/service. An application/service may be configured to enable users to participate in one or more data channels. A message thread may comprise content interacted with by one or more users. For example, a data channel is a conversation that a user has with one or more other users of an organization. A user may be part of a team that is setup to accomplish a task within an organization. Data channels may be setup for the team where each data channel is dedicated to a specific topic, department, project, etc. In alternative examples, a data channel may be a message thread managed by a single user such as the case where the user is maintaining a notes page of content to organize for a meeting, trip, etc. In such examples, a user may be working with a message thread and interact directly with a chat bot for assistance in managing the message thread and/or sharing the message thread with other users, among other examples.

During run-time execution, a chat bot interaction, occurring on a specific data channel of an application/service, results in the transmission of data between the chat bot application/service and the application/service providing the data channel. An exemplary run-time stack for a chat bot 102 is configured to transmit protocol data to enable a chat bot to interface with an application/service providing the data channel. For instance, a data channel component 106 may transmit protocol data to an application/service component 110 that manages a chat bot application/service. Interfacing between applications/services, including the transmission of protocol data for communication, is known to one skilled in the field of art. In cases where a data channel is provided by a third-party application/service, visibility may not be able to be provided into a specific data channel. State and business logic that is proprietary to a third-party application/service may make it difficult to debug a chat bot because developers may not be able to fully access necessary data and/or be required to comprehend and comb through extensive coding that may not be related to chat bot processing. As such, the run-time stack for a chat bot 102 is configured to implement a diagnostic middleware component 108 that acts as an intermediary to focus observation of data traffic on communications pertinent to chat bot.

The diagnostic middleware component 108 is configured to observe or trace communications provided between a chat bot application/service and a data channel. In doing so, the diagnostic middleware component 108 implements a middleware adapter that sits, in the run-time stack for a chat bot 102, between the data channel component 106 and the application/service component 110. Implementation of a middleware adapter may occur through a wired connection or through an application programming interface (API), where the middleware adapter is configured to execute processing that enables interfacing with other components of the run-time state for a chat bot 102 as well as a diagnostic visualization state component 104. Processing for implementing a middleware adapter is known to one skilled in the field of art.

Above what is known, an exemplary middleware adapter may be configured to observe data traffic (e.g., of protocol data transmitted between a chat bot application/service and an application/service providing a data channel) and filter specific types of data traffic that are pertinent to chat bot processing. For example, the middleware adapter may be configured to implement a listener to monitor data traffic; parse the data traffic for data traffic that is specific to chat bot execution for generation of debugging data visualization for a chat bot; filter the data traffic specific to chat bot execution; and communicate the filtered data traffic to the diagnostic visualization state component 104 for further emulation processing. Additionally, the middle adapter may be configured to send/receive control messages, including control messages for creating/maintaining a connection for monitoring data traffic sent within the run-time stack for a chat bot 102, so that necessary data can be sent to a diagnostic visualization state component 104 to generate a debugging data visualization for a chat bot interaction. Control message processing may be received directly from the diagnostic visualization state component 104 and/or from a data channel component 106 (where control messages are multiplexed with inbound channel traffic) as shown in FIGS. 1B and 1C, respectively.

An exemplary middleware adapter is further configured to interface with an application/service component 110 to receive data from applications/service that may further assist with generation of a debugging data visualization for a chat bot. For example, the middleware adapter is configured to interface with a chat bot application/service to obtain data related to a conversation task state of a chat bot during a chat bot interaction. In doing so, the middleware adapter is configured to interface with the application/service component 110 to obtain data identifying a conversation task state of a chat bot, during a chat bot interaction. Data identifying the conversation task state (e.g., run-time code for a chat bot) may be stored in an application state storage component 112, where the middleware adapter is configured to request and receive such data to propagate to the diagnostic visualization state component 104. In further examples, the middleware adapter is configured to retrieve other types of data from applications/services, knowledge repositories (e.g., of an application platform) that may further diagnostic evaluation of a chat bot during a chat bot interaction. For instance, signal data and/or telemetry data may be collected and aggregated to one or more levels and then provided to diagnostic visualization state component 104 for inclusion in a debugging data visualization of a chat bot. An exemplary middleware adapter may be configured to interface with an application/service component 110 to obtain such supplemental data and propagate that to the diagnostic visualization state component 104.

As indicated in the foregoing description, the diagnostic middleware component 108 may be further configured to interface with the diagnostic visualization state component 104. The diagnostic visualization state component 104 is configured as a chat bot diagnostic tool that processes received diagnostic data and generates a debugging data visualization to assist developers with debugging a chat bot. A non-limiting example of a debugging data visualization is provided in FIG. 3. It is to be understood that a representation of a debugging data visualization may vary from the example shown in FIG. 3 to include any of the data described herein. In some examples, the chat bot diagnostic tool may be configured to provide data visualizations in different modes. For instance, the chat bot diagnostic tool may present a diagnostic view mode to view emulated data for chat bot and diagnose potential bugs. In another example, the chat bot diagnostic tool may be configured to enter a debugging mode that enables developers to implement fixes when bugs are identified through tailored user interface features that make it easier to execute debugging processing. However, it is to be understood that the chat bot diagnostic tool can provide functionality described herein in any type of mode without departing from the spirit of the present disclosure.

In any example, the diagnostic middleware component 108 may be configured to copy inbound and outbound activities from a run-time stack for a chat bot 102, including state information related to operation of a chat bot during a chat bot interaction (e.g., a conversational task state of a chat bot), and propagate such data to the diagnostic visualization state component 104 for subsequent diagnostic processing. Examples of subsequent diagnostic processing comprise but are not limited to: emulating data traffic (e.g., inbound and outbound activities of components of the run-time stack for a chat bot 102) within a graphical user interface of a chat bot diagnostic tool (provided through the diagnostic visualization state component 104); generating a debugging data visualization for a chat bot interaction of a chat bot application/service; visually correlating, through a graphical user interface, activity of a run-time stack for a chat bot 102 in a graphical user interface; enabling debugging processing of a chat bot including programmed user interface features that enhance debugging processing; and providing diagnostic data related to operation of a chat bot (e.g., during a chat bot interaction) and/or developer specific interactions for debugging processing of a chat bot, among other examples.

As indicated in the foregoing description, while the middleware adapter may be configured to observe any type of data traffic transmitted through a run-time stack for a chat bot 102, specific types of data traffic that are pertinent to operation of a chat bot may be filtered and propagated to the diagnostic visualization state component 104. The diagnostic visualization state component 104 utilizes the filtered data traffic to provide a debugging data visualization of a chat bot through a graphical user interface. Emulation of filtered data traffic may comprise emulating message activity and the conversational task state of the chat bot for a developer to debug the chat bot in visual representation of diagnostic data related to chat bot interactions. For example, filtered message activity and data related to a conversational task state may be presented in a visually appealing manner, through a graphical user interface, so that users can easily and efficiently execute debugging processing. By emulating message activity and conversational task state for a chat bot, debugging processing can be enhanced through a visual correlation of message activity with a conversational task state to identify how a chat bot is processing data and making decisions during a specific chat bot interaction. In one non-limiting example, a chat bot diagnostic tool may be configured to display message activity and a conversational task state of a chat bot interaction in different user interface panes/windows, so that a developer can focus on specific types of content and related code and visually correlate what is going on as code is applied to process received message activity. Visual correlation between the message activity and the conversational task state provides a developer with the ability to efficiently identify bugs in the code of the chat bot for debugging purposes.

In further non-limiting examples, the diagnostic visualization state component 104 may be further configured to visually display, in a debugging data visualization, code related to a conversational task state of a chat bot and/or code related to a user state (e.g., of a user interacting with a chat bot). For instance, code representing a real-time representation of the conversation task state of the chat bot may be displayed, where the code comprises a bot state differential that indicates a point at which the chat bot changed tasks in the chat bot interaction. This may help a developer identify a potential bug in a chat bot because the point in which the chat bot executed a decision to change tasks is brought into focus. Additionally, a chat bot application/service may be configured to detect a user state of one or more users that are interacting with a chat bot. For example, a chat bot main comprise trained artificial intelligence that can predictively detect a tone of a user (e.g., through analysis of voice input or analysis of text input), which may be useful to assist with determining whether a chat bot is operating correctly during a chat bot interaction. In another example, user state data may pertain to the number of times that a user has interacted with the chat bot to satisfy a specific task or objective. For example, a user may be planning a trip to Paris where the user is utilizing the chat bot to help it book a plane ticket to Paris. The user may have initially provided the destination in a first message to a chat bot, so it may be important to track a number of queries directed to the user and responses from the user so that a task of the chat bot is efficiently completed. Detecting a user state in a chat bot interaction (e.g., count as to how many queries and/or responses that a user is subject to in a chat bot interaction) may assist with determining whether a chat bot needs to provide certain responses (e.g., an apology) or whether a developer needs to debug the chat bot in real-time by changing a conversational task state of the chat bot, among other examples.

Moreover, a chat bot diagnostic tool may be configured to highlight, through the graphical user interface, specific message activity that correlates with a change in the bot state differential (or a user state differential) to further assist with debugging of the chat bot. For instance, a developer may select a portion of code related to the bot state differential that indicates a change in a conversation task state of a chat bot or a change to a user state during a chat bot interaction. The chat bot diagnostic tool may be configured to highlight, through the graphical user interface, message activity that was the trigger for a change in the bot state differential or a change to a user state.

Additionally, a debugging data visualization may further comprise display of a log of traced data traffic between the chat bot and the channel of the application or service. This may enable developers to review all data processed by a chat bot to help gain a fuller picture as to potential issues that may be plaguing a chat bot during a chat bot interaction. The debugging data visualization may further be configured to display a status of a connection for tracing data traffic passed through a run-time stack of a chat bot. For example, the chat bot diagnostic tool may be configured to enable a developer to initiate, via a middleware adapter, a connection to a real-time chat bot interaction, through the debugging data visualization. In other alternative examples, the chat bot diagnostic tool may be configured to automatically initiate, via a middleware adapter, a connection for tracing data traffic, where display of a debugging data visualization may present insights into an active chat bot interaction. In further examples, the developer can modify a state of the connection through the debugging data visualization.

As described in the foregoing description, the diagnostic visualization state component 104 may further be configured to interface with knowledge repositories, that may be managed by an application/service component 110. Knowledge resources comprise any data affiliated with a software application platform (e.g., Microsoft®, Google®, Apple®, IBM®) as well as data that is obtained through interfacing with resources over a network connection including third-party applications/services. This may assist with obtaining signal data, telemetric data, to generate a richer version of a debugging data visualization.

FIG. 1B illustrates exemplary process flow 120 for interaction between a run-time stack of a chat bot 102 and a diagnostic visualization state component 104 as described herein, where control messages may be transmitted between the diagnostic visualization state component 104 and the diagnostic middleware component 108 to enable data traffic to be monitored, filtered and provided in an exemplary debugging data visualization that is provided through a graphical user interface of the diagnostic visualization state component 104. In one non-limiting example, the diagnostic visualization state component 104 may interface with a middleware adapter of the diagnostic middleware component 108 to directly communicate a control messages 122 to the middleware adapter. Exemplary control messages 122 may comprise communications that manage queries of the diagnostic visualization state component 104, for example, to initiate a connection to monitor/trace data traffic of a run-time stack for a chat bot 102 or update a state of the connection. For example, the diagnostic visualization state component 104 may be configured to transmit one or more control messages 122, to the diagnostic middleware component 108, to initiate a connection for tracing of the data traffic of the run-time stack for a chat bot 102. This may be a trigger to monitor data traffic related to a chat bot interaction during real-time processing. Based on processing of the one or more control messages 122, data traffic may be traced, filtered and provided to a chat bot diagnostic tool. During presentation of an exemplary debugging data visualization, the diagnostic visualization state component 104 may be configured to present a state of the connection through the graphical user interface of the chat bot diagnostic tool. In some examples, a developer can select a user interface feature, through the graphical user interface, to manage a state of a connection to trace/monitor data traffic of the run-time stack for a chat bot 102. In further examples, the diagnostic visualization state component 104 is configured to enable transmission of follow-up control messages to modify a state of a connection for monitoring/tracing data traffic. In such examples, a state of the connection may be updated, through the graphical user interface of the chat bot diagnostic tool. based on processing of the follow-up control messages.

FIG. 1C illustrates exemplary process flow 140 for interaction between a run-time stack of a chat bot 102 and a diagnostic visualization state component 104 as described herein, providing an alternative method of transmission of control messages between the diagnostic visualization state component 104 and the diagnostic middleware component 108. In the example shown in process flow 140, exemplary control messages 142 may be multiplexed, with inbound data traffic of a data channel, where the data channel component 106 is configured to provide the control message to the middleware adapter of diagnostic middleware component 108 along with the inbound traffic of a data channel. In such instances, the middleware adapter traces the inbound activity from the data channel to detect transmission of the one or more control messages 142. Control messages 142, like control messages 122, may comprise communications that manage queries of the diagnostic visualization state component 104, for example, to initiate a connection to monitor/trace data traffic of a run-time stack for a chat bot 102 or update a state of the connection.

FIG. 2 illustrates an exemplary method 200 related to processing operations for generation and provision of a chat bot diagnostic visualization, with which aspects of the present disclosure may be practiced. Processing operations described in method 200 may be executed by components described in process flows 100-160 (FIGS. 1A-1C), where the detailed description in process flows 100-160 supports and supplements the recited processing operations in method 200. Interfacing and communication between exemplary components, such as those described in process flows 100-160, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

As an example, method 200 may be executed across an exemplary computing system 401(or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where a chat bot diagnostic tool is launched. Examples of a chat bot diagnostic tool have been provided in the foregoing description including the description of process flows 100-160 (FIGS. 1A-1C, respectively). As indicated in the foregoing description, the chat bot diagnostic tool may be provided by a diagnostic visualization state component 104 and represent a state of an interaction with a run-time stack for a chat bot (102 of FIG. 1) for a developer to debug a chat bot during a chat bot interaction in real-time (or near real-time). In doing so, a graphical user interface is presented that provides a visualization of diagnostic data to assist with debugging a chat bot during a chat bot interaction. A non-limiting example of a graphical user interface representation (e.g., debugging data visualization) is provided in FIG. 3.

Flow of method 200 may proceed to processing operation 204, where a connection to trace data traffic of a run-time stack of a chat bot is initiated. In some examples, processing operation 204 comprises initiating a connection to trace the data traffic of the run-time stack of a chat bot through a graphical user interface of the chat bot diagnostic tool. For instance, a developer may select a user interface feature or provide a command through a command prompt, provided through the graphical user interface, to begin monitoring/observing data traffic associated with a run-time stack of a chat bot. This may be a trigger for provision of filtered data traffic through the graphical user interface of the chat bot diagnostic tool so that a developer can debug a chat bot during a chat bot interaction. In alternative examples, a diagnostic visualization state component 104 is configured to automatically interface with a diagnostic middleware component 108 to initiate connection to monitor/trace data traffic for a run-time stack of a chat bot, where data processing, resulting from that connection, is updated through the graphical user interface of the chat bot diagnostic tool.

In any example, processing operation 204 comprises transmitting one or more control messages to a middleware adapter that is configured to monitor/trace data traffic of a run-time stack for a chat bot. Examples related to control message processing have been provided in the foregoing description including the description of FIGS. 1A-1C. In one example, processing operation 204 comprises transmitting, to the diagnostic middleware from the chat bot diagnostic tool, a control message to initiate a connection for tracing of the data traffic. Processing operation 204 may further comprise presenting a state of the connection through the graphical user interface of the chat bot diagnostic tool. In an alternative example, processing operation 204 comprises multiplexing, with inbound data traffic of a data channel, a control message to initiate a connection for tracing of the data traffic, and then presenting a state of the connection through the graphical user interface of the chat bot diagnostic tool.

Once a connection has been established between a middleware adapter and a chat bot diagnostic tool, flow of method 200 may proceed to processing operation 206. At processing operation 206, data traffic of a run-time stack for a chat bot is traced. Tracing of data traffic comprises monitoring/observing data traffic transmitted between a chat bot application/service and an application/service providing a data channel. In some examples, processing operations for initiating a connection to trace data traffic of a run-time stack for a chat bot may be programmed operations that occur when code is executed to trace data traffic of the run-time stack for a chat bot. Tracing of data traffic may comprise inspecting communications propagated between components of the run-time stack for a chat bot. For instance, a middleware adapter may be programmed to executed processing operations to parse and analyze protocol data transmitted between chat bot stack components. Processing for inspecting network data, such as protocol data transmitted between service components, is known to one skilled in the field of art.

At processing operation 208. Traced data traffic is filtered. Traced data traffic is filtered (processing operation 208) to identify a chat bot interaction of a chat bot within a data channel. A chat bot interaction may comprise an interaction with a chat bot application/service that comprises one or more users. Filtering (processing operation 208) of the traced data traffic comprises processing operations such as: identifying message activity during a chat bot interaction; and identifying a conversational task state of a chat bot during the chat bot interaction. As described in the foregoing description, other types of data traffic that is pertinent to a chat bot interaction may also be filtered and included in a debugging data visualization that is provided through a chat bot diagnostic tool.

Flow of method 200 may proceed to processing operation 210, where a debugging data visualization of a chat bot interaction is generated and presented in a graphical user interface of the chat bot diagnostic tool. Processing for generation and presentation of an exemplary debugging data visualization has been described in the foregoing description. For example, processing operation 210 comprises emulating, based on the filtered data traffic, the message activity and the conversational task state of the chat bot in a debugging data visualization presented through the graphical user interface of the chat bot diagnostic tool. For example, filtered message activity and data related to a conversational task state may be presented in a visually appealing manner, through a graphical user interface, so that users can easily and efficiently execute debugging processing, for example, through correlation of message activity with a conversational task state of a chat bot. In one non-limiting example, a chat bot diagnostic tool may be configured to display, in a debugging data visualization, message activity and a conversational task state of a chat bot interaction. This may occur in different user interface panes/windows so that a developer can focus on specific types of content and related code.

In further non-limiting examples, code related to a conversational task state of a chat bot and/or code related to a user state (e.g., of a user interacting with a chat bot) may also be displayed through the graphical user interface during presentation of a debugging data visualization. For instance, code representing a real-time representation of the conversation task state of the chat bot may be displayed, where the code comprises a bot state differential that indicates a point at which the chat bot changed tasks in the chat bot interaction. This may help a developer identify a potential bug in a chat bot because the point in which the chat bot executed a decision to change tasks is brought into focus. As previously described, similar functionality may be provided to delve into a user state of one or more users during a chat bot interaction.

Furthermore, the chat bot diagnostic tool may be configured to highlight, through the debugging data visualization, specific message activity that correlates with a change in the bot state differential to further assist with debugging of the chat bot. For instance, a developer may select a portion of code related to the bot state differential (or a user state differential) that indicates a change in a conversation task state of a chat bot. The chat bot diagnostic tool may be configured to highlight, through the graphical user interface, message activity that was the trigger for a change in the bot state differential.

Additionally, a debugging data visualization may further comprise display of a log of traced data traffic between the chat bot and the channel of the application or service. This may enable developers to review all data processed by a chat bot to help gain a fuller picture as to potential issues that may be plaguing a chat bot during a chat bot interaction. The debugging data visualization may further be configured to display a status of a connection for tracing data traffic passed through a run-time stack of a chat bot. For example, the chat bot diagnostic tool may be configured to enable a developer to initiate, via a middleware adapter, a connection to a real-time chat bot interaction, through the debugging data visualization. In other alternative examples, the chat bot diagnostic tool may be configured to automatically initiate, via a middleware adapter, a connection for tracing data traffic, where display of a debugging data visualization may present insights into an active chat bot interaction. In further examples, the developer can modify a state of the connection through the debugging data visualization.

Moreover, the chat bot diagnostic tool may be further be configured to correlate and display other types of data to assist with debugging of the chat bot. For instance, other types of data traffic may be filtered and presented through the debugging data visualization. Non-limiting examples of such data traffic may comprise but is not limited to: data traffic related to a real-time state of the channel during the chat bot interaction; data traffic related to a change in participants in the chat bot interaction through a channel, data traffic related to detection of a modality of the received input (e.g., voice, typed, handwritten); and data traffic related to user interactions with devices during the chat bot interaction, among other examples. The chat bot diagnostic tool may further be configured to interface with other knowledge repositories to acquire feedback data to assist with debugging. For example, signal data may be collected and aggregated to one or more levels (e.g., application/service level, user level, device level or a combination thereof), which may provide further insights to help debug issues with a chat bot. Telemetry data may be generated at one or more of the signal levels, where metrics may be presented in a user interface element (e.g., pane or window) of the graphical user interface to assist developers with assessing a chat bot. In further instances, the debugging data visualization may additionally comprise real-time status of developers and/or developer feedback during debugging processing, for example, that may be presented through a graphical user interface of the chat bot diagnostic tool. For instance, developers may be collaboratively working to resolve a bug in real-time. In such instances, it is helpful to understand progress of another developer such as what code they are inspecting, highlighting of potential bugs, changes to code and/or developer comments during a debugging session, among other examples.

Flow of method 200 may proceed to decision operation 212, where it is determined whether there are issues to be debugged based on analysis of the chat bot interaction through the debugging data visualization. In examples where no bugs or issues are identified, flow of decision operation 212 branches NO and processing of method 200 proceeds to processing operation 216. In examples where bugs or issues are identified during analysis of a chat boy interaction, flow of decision operation 212 branches YES and processing of method 200 proceeds to processing operation 214.

At processing operation 214, a chat bot application/service is debugged to remediate identified bugs/issues. In some examples, the debugging data visualization may be configured to enable developers to execute debugging processing directly though the debugging data visualization. For instance, the debugging data visualization may be tied into an integrated development environment to edit code of a chat bot application/service. In one instance, this may occur when a developer switches between a diagnostic mode and a debugging mode of the chat bot diagnostic tool. In further examples, user interface elements may be programmed into the debugging data visualization that enables developers to execute debugging processing directly through the debugging data visualization. In other examples, the chat bot diagnostic tool is configured to launch another application/service to enable developers to execute debugging processing.

Flow of method 200 may then proceed to decision operation 216, where it is determined whether a connection for tracing data traffic of a run-time stack for a chat bot has ended. In examples where a chat bot interaction is still active and/or the developer is still reviewing a chat bot interaction (e.g., that may have recently occurred), flow of decision operation 216 branches NO and processing of method 200 remains idle until subsequent action is taken through the chat bot diagnostic tool. In other instances, a developer may end the connection for tracing data traffic of a run-time stack for a chat bot. For example, a control message may be initiated from the chat bot diagnostic tool to end tracing of the data traffic. This may occur when a developer may determine to cease review of the chat bot interaction (e.g., because a bug has been fixed) or the actual real-time chat bot interaction may be completed. In such examples, flow of decision operation 216 may branch YES and processing of method 200 may proceed to decision operation 218. At processing operation 218, a state of the connection for tracing data traffic of a run-time stack for a chat bot may be updated in the chat bot diagnostic tool. Processing operation 218 may comprise updating the graphical user interface of the debugging data visualization to illustrate that a real-time connection has ended.

Figure 3:
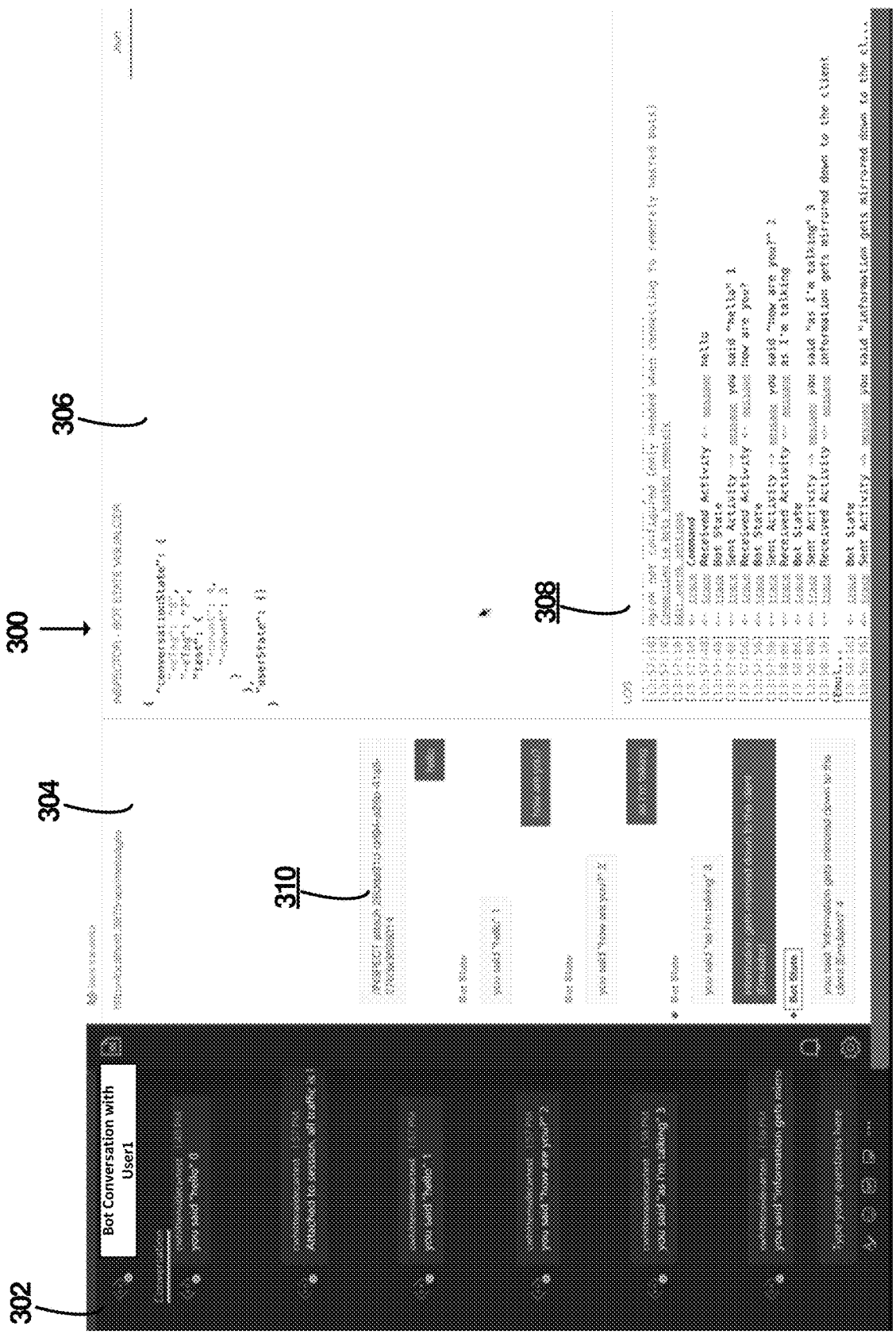
FIG. 3 illustrates an exemplary processing device view of a debugging data visualization of an exemplary chat bot diagnostic tool, with which aspects of the present disclosure may be practiced.

FIG. 3 illustrates an exemplary processing device view 300 of a debugging data visualization of an exemplary chat bot diagnostic tool, with which aspects of the present disclosure may be practiced. Processing device view 300 provides a non-limiting illustrative example of a visualization that is generated and presented, through a graphical user interface of a chat bot diagnostic tool, based on processing described in the foregoing description including the description of process flows 100-160 (FIGS. 1A-1C) and method 200 (FIG. 2).

Processing device view 300 comprises a chat bot message pane 302 that provides a visual representation of message activity occurring through a real-time (or near real-time) chat bot interaction. Chat bot message pane 302 provides a developer with a view of the message activity provided by as user (or a developer in a testing scenario) that is occurring in a chat bot interaction. The chat bot message pane 302 may be presented side-by-side with other diagnostic panes such as a connection transcript pane 304, a chat bot code pane 306 and an activity log pane 308, to enable a developer to visualize how message activity affects a state of a chat bot. The chat bot message pane 302 may be configured to provide real-time interaction with a chat bot. For example, developers may be able to track messages of a real-time interaction with a chat bot that is occurring in a data channel. In alternative instances, developers may be able to directly enter messages to affect operation of a chat bot. For example, this may occur when a developer is manually debugging a chat bot application/service or just testing operation of a chat bot application/service.

The connection transcript pane 304, provides filtered activity insights in a visual representation, where the filtered activity insights are useful for a developer to determine how a chat bot application/service is operating. The connection transcript pane 304 is configured to update a developer of a state of a connection for tracing data traffic related to a chat bot interaction, for example, data traffic that is transmitted in a run-time stack for a chat bot. As shown in processing device view 300, a connection state indicator 310 is provided to indicate that a connection has initiated for tracing data related to a chat bot interaction. In some example, connection status indicator 310 may be a selectable user interface element in the debugging data visualization. For example, selection of the connection state indicator 310 may toggle on/off a connection for tracing data related to a chat bot interaction. The connection transcript pane 304 may further provide visual representation of a bot state (e.g., conversation task state of a chat bot) relative to message activity that is received from a user. This provides a developer with a visual way to track a bot state as it progresses through a chat bot interaction.

Processing device view 300 further comprises the chat bot code pane 306. The chat bot code pane 306 provides a visual representation of coding of conversation task state of a chat bot application/service relative to message activity that the chat bot has received and processed. The chat bot code pane 306 provides a developer with a way to visualize, through code of the chat bot application/service, when a conversation task state of a chat bot application/service changes. As such, the chat bot code pane 306 provides a real-time view of a change in a conversational task state of a chat bot, which the developer can easily visually correlate with the other diagnostic panes such as the chat bot message pane 302 and the connection transcript pane 304. Pane 306 may comprise code representing a real-time representation of the conversation task state of the chat bot, where the code comprises a bot state differential that indicates a point at which the chat bot changed tasks in the chat bot interaction. This may help a developer identify a potential bug in a chat bot because the point in which the chat bot executed a decision to change tasks is brought into focus. As described in the foregoing description, a user state (and user state differential) may also be tracked in some alternative examples. In such instances, code representing a user state during a chat bot interaction may also be presented through the chat bot code pane 306 or through a separate user interface pane specific to managing a user state.

The debugging data visualization shown in processing device view 300 further comprises an activity log pane 308. The activity log pane 308 is configured to display any activity detected and managed through the chat bot diagnostic tool. This may comprise a state of any data traffic observed and/or traced as well as provide a log view of the chat bot interaction (e.g., control messages transmitted and/or received; state of a connection for tracing data traffic related to a chat bot interaction; traced data including received message activity and a corresponding conversation task state of a chat bot; developer comments and status updates; and detected user state during a chat bot interaction, among other examples. As described previously, a debugging data visualization may be adapted to provide other types of data that may be useful to aid a developer in debugging a chat bot application/service. Examples of such data have been previously provided.

FIG. 4 illustrates a computing system 401 suitable for implementing processing operations described herein related to generation and presentation of a chat bot diagnostic visualization, with which aspects of the present disclosure may be practiced. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components 406 that are configured as relevance suggestion component(s) executing processing operations as described herein including identification and presentation of contextually relevant productivity features for user access to an electronic document. In some examples, computing system 401 may be a device that a user utilizes to access an application/service in which contextually relevant suggestions are surfaced. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute exemplary process flows 100-140 (FIGS. 1A-1C) as well as method 200 (FIG. 2), where processing operations may be specifically executed that are related to generation and provision of a chat bot diagnostic visualization, as described in the foregoing description.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for a diagnostic visualization state component(s) 406a, application/service component(s) 406b (e.g., of a software application platform), and other service-based components including interaction with third-party applications/services, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services). User interface system 409 comprises a graphical user interface that presents a chat bot diagnostic visualization.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
launching a chat bot diagnostic tool, wherein the launching presents a graphical user interface configured to display diagnostic data for debugging a chat bot;
transmitting, from the chat bot diagnostic tool, a control message to a diagnostic middleware adapter of a runtime stack of the chat bot to establish a connection between the chat bot diagnostic tool and the diagnostic middleware adapter;
tracing, with the diagnostic middleware adapter, data traffic between the chat bot and a data channel of an application or service;
filtering, with the diagnostic middleware adapter, the traced data traffic to identify a chat bot interaction of the chat bot within the data channel, wherein the filtering comprises:
identifying message activity during the chat bot interaction, and
identifying a corresponding conversational task state of the chat bot during the chat bot interaction;

transmitting, from the diagnostic middleware adapter to the chat bot diagnostic tool via the connection, the filtered data traffic; and emulating, by the chat bot diagnostic tool in real-time based on the filtered data traffic, the message activity and the corresponding conversational task state of the chat bot in a debugging data visualization, wherein the emulating comprises displaying, through the graphical user interface of the chat bot diagnostic tool, the message activity and the corresponding conversational task state as the chat bot interaction progresses.

2. The method of claim 1, further comprising: debugging, through the graphical user interface, the chat bot based on the debugging data visualization.

3. The method of claim 1, further comprising: presenting a state of the connection through the graphical user interface of the chat bot diagnostic tool.

4. The method of claim 3, further comprising:
transmitting, from the chat bot diagnostic tool, a second control message to the diagnostic middleware adapter to end the connection for tracing of the data traffic; and
updating the state of the connection through the graphical user interface of the chat bot diagnostic tool based on processing of the second control message.

5. The method of claim 1, wherein the tracing further comprises:
multiplexing, with inbound data traffic of the data channel, the control message to initiate the connection for tracing of the data traffic; and
displaying a state of the connection through the graphical user interface of the chat bot diagnostic tool.

6. The method of claim 1, wherein the emulating further comprises displaying, through the graphical user interface, a bot state differential indicating a point at which the chat bot changed tasks in the chat bot interaction.

7. The method of claim 6, wherein the chat bot diagnostic tool highlights, through the graphical user interface, specific message activity that correlates with a change in the bot state differential to assist with debugging of the chat bot.

8. The method of claim 1, wherein the emulating further comprises displaying, through the graphical user interface, a log of the traced data traffic between the chat bot and the data channel of the application or service.

9. A system comprising:
at least one processor; and
a memory, operatively connected with the at least one processor, storing computer-executable instructions that, when executed by the at least one processor, causes the at least one processor to execute a method that comprises:
launching a chat bot diagnostic tool, wherein the launching presents a graphical user interface configured to display diagnostic data for debugging a chat bot;
transmitting, from the chat bot diagnostic tool, a control message to a diagnostic middleware adapter of a run-time stack of the chat bot to establish a connection between the chat bot diagnostic tool and the diagnostic middleware adapter;
tracing, with the diagnostic middleware adapter, data traffic between the chat bot and a data channel of an application or service;
filtering, with the diagnostic middleware adapter, the traced data traffic to identify a chat bot interaction of the chat bot within the data channel, wherein the filtering comprises:
identifying message activity during the chat bot interaction, and
identifying a corresponding conversational task state of the chat bot during the chat bot interaction;
transmitting, from the diagnostic middleware adapter to the chat bot diagnostic tool via the connection, the filtered data traffic; and
emulating, by the chat bot diagnostic tool in real-time based on the filtered data traffic, the message activity and the corresponding conversational task state of the chat bot in a debugging data visualization, wherein the emulating comprises displaying, through the graphical user interface of the chat bot diagnostic tool, the message activity and the corresponding conversational task state as the chat bot interaction progresses.

10. The system of claim 9, wherein the method, executed by the at least one processor, further comprises: debugging, through the graphical user interface, the chat bot based on the debugging data visualization.

11. The system of claim 9, wherein the method, executed by the at least one processor, further comprises: presenting a state of the connection through the graphical user interface of the chat bot diagnostic tool.

12. The system of claim 11, wherein the method, executed by the at least one processor, further comprises:
transmitting, from the chat bot diagnostic tool, a second control message to the diagnostic middleware adapter to end the connection for tracing of the data traffic; and
updating the state of the connection through the graphical user interface of the chat bot diagnostic tool based on processing of the second control message.

13. The system of claim 9, wherein the tracing further comprises:
multiplexing, with inbound data traffic of the data channel, the control message to initiate the connection for tracing of the data traffic; and
displaying a state of the connection through the graphical user interface of the chat bot diagnostic tool.

14. The system of claim 9, wherein the emulating further comprises displaying, through the graphical user interface, a bot state differential indicating a point at which the chat bot changed tasks in the chat bot interaction.

15. The system of claim 14, wherein the chat bot diagnostic tool highlights, through the graphical user interface, specific message activity that correlates with a change in the bot state differential to assist with debugging of the chat bot.

16. The system of claim 9, wherein the emulating further comprises displaying, through the graphical user interface, a log of the traced data traffic between the chat bot and the data channel of the application or service.

17. A computer-readable storage media storing computer-executable instructions that, when executed by at least one processor, causes the at least one processor to execute a method comprising:
launching a chat bot diagnostic tool, wherein the launching presents a graphical user interface configured to display diagnostic data for debugging a chat bot;
transmitting, from the chat bot diagnostic tool, a control message to a diagnostic middleware adapter of a run-time stack of the chat bot to establish a connection between the chat bot diagnostic tool and the diagnostic middleware adapter;
tracing, with the diagnostic middleware adapter, data traffic between the chat bot and a data channel of an application or service;

filtering, with the diagnostic middleware adapter, the traced data traffic to identify a chat bot interaction of the chat bot within the data channel, wherein the filtering comprises:
  identifying message activity during the chat bot interaction, and
  identifying a corresponding conversational task state of the chat bot during the chat bot interaction;
transmitting, from the diagnostic middleware adapter to the chat bot diagnostic tool via the connection, the filtered data traffic; and
emulating, by the chat bot diagnostic tool in real-time based on the filtered data traffic, the message activity and the corresponding conversational task state of the chat bot in a debugging data visualization, wherein the emulating comprises displaying, through the graphical user interface of the chat bot diagnostic tool, the message activity and the corresponding conversational task state as the chat bot interaction progresses.

18. The computer-readable storage media of claim 17, wherein the executed method further comprising: debugging, through the graphical user interface, the chat bot based on the debugging data visualization.

19. The computer-readable storage media of claim 17, wherein the emulating further comprises displaying, through the graphical user interface, a bot state differential indicating a point at which the chat bot changed tasks in the chat bot interaction.

20. The computer-readable storage media of claim 17, wherein the emulating further comprises displaying, through the graphical user interface, a log of the traced data traffic between the chat bot and the data channel of the application or service.

* * * * *